United States Patent
Reußmann et al.

(10) Patent No.: US 8,621,722 B2
(45) Date of Patent: Jan. 7, 2014

(54) METHOD FOR THE CONTINUOUS PRODUCTION OF LAID STAPLE FIBRE FABRICS FROM FINITELY LONG REINFORCING FIBRES WITH ALIGNED FIBRE ORIENTATION

(75) Inventors: Thomas Reußmann, Rudolstadt (DE); Renate Lützkendorf, Koenigsee (DE); Gerald Ortlepp, Uhlstaedt (DE)

(73) Assignees: SGL Carbon SE, Wiesbaden (DE); Bayerische Motorenwerke AG, Munich (DE)

( * ) Notice: Subject to any disclaimer, the term of this patent is extended or adjusted under 35 U.S.C. 154(b) by 0 days.

(21) Appl. No.: 13/512,282

(22) PCT Filed: Nov. 11, 2010

(86) PCT No.: PCT/EP2010/067316
§ 371 (c)(1),
(2), (4) Date: Jul. 19, 2012

(87) PCT Pub. No.: WO2011/064103
PCT Pub. Date: Jun. 3, 2011

(65) Prior Publication Data
US 2012/0279017 A1 Nov. 8, 2012

(30) Foreign Application Priority Data
Nov. 27, 2009 (DE) .......................... 10 2009 055 912

(51) Int. Cl.
*D01G 25/00* (2006.01)

(52) U.S. Cl.
USPC .......................................... 19/302; 19/161.1

(58) Field of Classification Search
USPC ................. 19/161.1, 163, 296, 300, 302, 304
See application file for complete search history.

(56) References Cited

U.S. PATENT DOCUMENTS

| 3,183,557 | A | * | 5/1965 | Hollowell | 19/163 |
| 3,220,811 | A | * | 11/1965 | Schuller | 65/479 |
| 4,481,694 | A | * | 11/1984 | Dilo | 19/296 |
| 5,182,835 | A | | 2/1993 | De Giudici | |
| 5,476,703 | A | | 12/1995 | Wattel | |
| 5,489,351 | A | * | 2/1996 | Yoshida et al. | 156/62.6 |

FOREIGN PATENT DOCUMENTS

| DE | 3242539 A1 | 11/1982 |
| DE | 69707916 T2 | 3/1998 |
| DE | 10301646 A1 | 7/2004 |
| DE | 10345953 A1 | 5/2005 |
| DE | 60109729 T2 | 2/2006 |

(Continued)

*Primary Examiner* — Shaun R Hurley
(74) *Attorney, Agent, or Firm* — Dennemeyer & Associates, LLC.

(57) ABSTRACT

The present invention relates to a method for the continuous production of laid staple fiber fabrics with aligned fiber orientation, in which method the laid fabrics are produced by continuous plaiting down of carded fiber web at defined laying angles onto a synchronized transport belt (1), wherein the carding machine (2) and plaiting means (3) arranged downstream of it are arranged at an acute angle with respect to the advancing direction of the transport belt. Said laid staple fiber fabrics are used for producing high-strength fiber-reinforced plastic composites, as are used in wind power plants, aircraft construction and the automotive industry. In particular in the loading direction, said composites have high composite strengths and rigidities, to which end a defined fiber orientation is required. In addition to a defined orientation of the finite fibers, the laid fabrics also have a defined mass per unit area.

11 Claims, 1 Drawing Sheet

(56) References Cited

FOREIGN PATENT DOCUMENTS

| | | |
|---|---|---|
| DE | 102006035847 A1 | 2/2008 |
| DE | 102006057633 A1 | 2/2008 |
| EP | 1798175 A1 | 6/2007 |
| EP | 2028307 A1 | 8/2007 |
| GB | 2012671 A | 1/1978 |

* cited by examiner

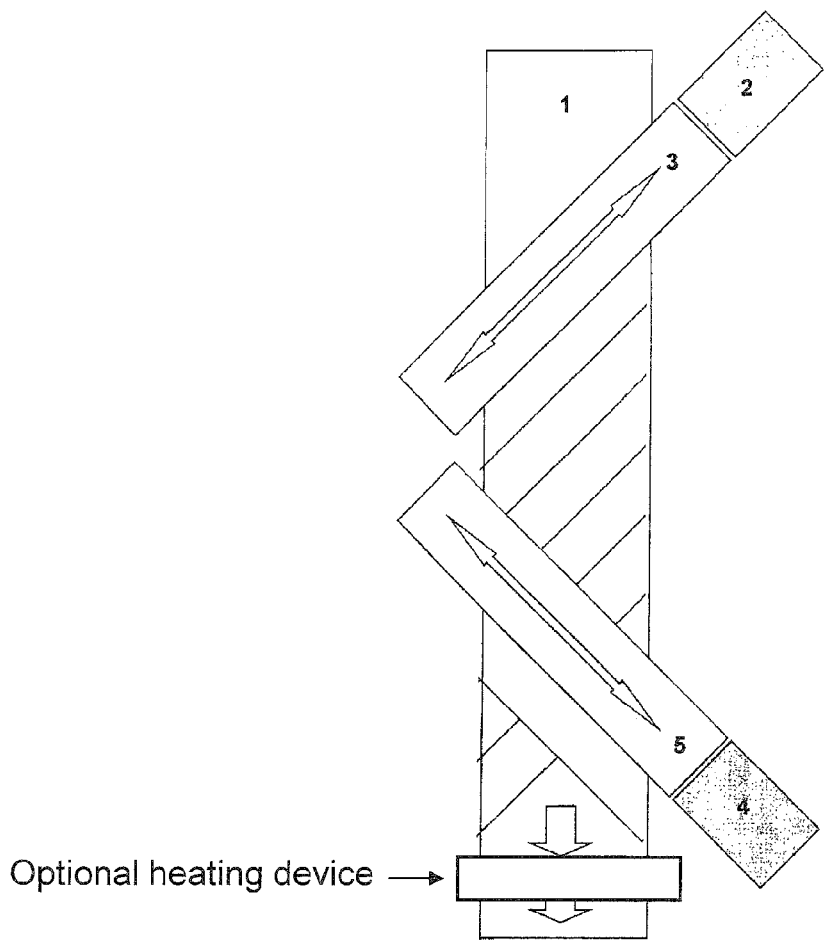

METHOD FOR THE CONTINUOUS PRODUCTION OF LAID STAPLE FIBRE FABRICS FROM FINITELY LONG REINFORCING FIBRES WITH ALIGNED FIBRE ORIENTATION

The present invention relates to a method for the continuous production of laid staple fiber fabrics with aligned fiber orientation, wherein the fabrics are created by means of continuous plaiting down of carded fiber web at defined laying angles.

Laid staple fiber fabrics produced according to such method are used, for example, for the production of high-strength fiber-reinforced plastic composites, as found in wind power plants, aircraft construction and the automotive industry. In particular in the loading direction said composites have high composite strengths and rigidities, to which end a defined fiber orientation is required. In addition to a defined orientation of the finite fibers, the laid fabrics also have a defined mass per unit area.

PRIOR ART

In the area of fiber composite technology, many new developments have been implemented into practice in recent years with a series of applications in wind power plants, aircraft construction, and the automotive industry. In association with the increased use of fiber compounds, the establishing of economical processing methods has also gained in significance. This applies in particular to the manufacture of the fiber composite semi-finished products (production of wovens, non-wovens, and fabrics).

In addition to the known textile semi-finished products, such as rovings, fabrics, and non-wovens, laid fabrics also have a significant meaning in the production of fiber composite materials. Because of the stretched and high-oriented fiber position, very high strengths and rigidities may be achieved at a low weight of the components with UD-fabrics and multi-axial fabrics. The fabrics are currently produced from a plurality of endless rovings by means of so-called laying systems. Such a method is described, for example, in patent EP2028307. Using the already known laying systems the fiber orientations may each be precisely adjusted depending on the requirement. Usually, the composites are produced using a symmetrical overall construction of different individual layers that have been laid at different angles (0°, 90°, +45°, −45°). The layer construction of the multi-axial fabrics is carried out accordingly. The use of infinitely long reinforcement fibers is characteristic for the classic fabric construction. A high tensile strength of the rovings is required in the currently used laying systems, because high thread tensions must be exerted in order to realize a stretched fiber position. A continuous feeding of finitely long fibers or semi-finished products made from finitely long fibers having a low tensile strength is not possible using the conventional laying systems.

A further possibility of producing defined fiber orientations is the winding method.

The utilization of this technology for the production of multi-axial fabrics is described in patent DE102006057633. The known method is characterized in that the winding plane and the storage of the mono-axial fabric rotate about each other in order to produce a fabric having a defined fiber orientation. The angle of the fiber orientation is adjusted by means of the angle of the longitudinal axis of the winding plane in relation to the direction of gravity. However, in this principle endless rovings or endless mono-axial fabrics are also used. For this purpose high tensile strengths are applied to the material to be wound. The feeding and laying of finite fibers is not possible with this method.

In addition to the use of continuous fibers, however, the use of fibers having limited fiber lengths (staple fibers) is also of interest for the production of composite materials. For this reason some developments in this regard have been known in the past.

One variation of the processing of finitely long fiber materials is the tape laying, wherein laid fabrics made of fiber sections may also be produced, and the tension-free laying of reinforcement materials is possible.

In this regard a number of known technical solutions are described, for example, in patents DE10301646, DE102006035847. However, in these cases only the discontinuous laying of laid pieces is described. A continuous tension-free laying of finitely long fibers is not possible in this process. The combination of non-woven laying processes and classical laid fiber production is also known. A method is described in patent GB2012671, wherein finitely long carbon fibers are combined with continuous fibers. However, a defined orientation of the finitely long fibers cannot be achieved with this method.

The continuous laying of finitely long fibers by means of plaiting machines is known from the textile industry. The production of laterally oriented fiber non-wovens and cross layer non-wovens is described, for example, by Joachim Lüneschloss et al.: Non-wovens, Georg Thieme Verlag, 1982, p. 94-104, ISBN: 3-13-609401-8. Reference is made to the explanations and images, as well as the definitions of the terms therein for the general understanding of the present invention. Using said processes, fiber web is laid on top of each other multiple times by means of a carding machine in order to create a template for the non-woven production that is defined with regard to the mass per unit area and the laying width. A principle utilized most often is the lateral plaiting down of the fiber web. In this regard the web created by the carding machine is laid on a continuously running transport belt that is arranged at an angle of 90° toward the production orientation of the carding machine. The speed of the laying on the belt, the laying width, and the speed of the transport belt determine the mass per unit area of the laid fabric being produced on the belt. With the laying of the web onto the transport belt a certain angle of the fiber orientation within the laid fabric is set depending on the various speeds of the laying width. The various angles may be realized due to the layout of the plaiting machines and the common speeds with web production. However, the angles are always significantly smaller than 45°. It is particularly characteristic for the carding of fiber web that due to the continuous laying onto the running transport belt a preferential orientation in 2 directions (undefined angle) is created. In this manner said principle for the production of fiber fabrics having a defined fiber orientation (e.g. exactly at the angle +45° or −45°) is not possible.

U.S. Pat. No. 5,476,703 describes a method, wherein a fiber web is continuously laid down in multiples layers by means of a plaiting machine, wherein initially the alignment of the individual layers is 75° to 90° toward the longitudinal extension of the non-woven, and the non-woven is then stretched by means of a needle stretching field in order to change the angle of the fiber alignment within the non-woven. However, with this method an exactly defined fiber orientation at predetermined angles is not possible, but instead only an approximation of the non-woven properties in the longitudinal and lateral directions. In this method the fiber orientation may not be set in a defined manner, and may locally vary within the non-woven due to various different stretching degrees.

A method for the production of web and non-woven sheets is described in DE 32 42 539 A 1, the width of which exceeds the working width of the actual non-woven forming machines. In this regard two web sheets are each deflected toward the working direction of the non-woven forming machine by 90°, wherein the deflections are arranged at a distance to each other that corresponds to the width of one of the web sheets such that the two web sheets are positioned next to each after the deflection, and a web sheet having double the width is created. This represents the enlarging of widths of commodities that may be produced. An aligned laying of staple fibers at defined angles is not possible using said known methods.

A method for the continuous production of laid staple fiber fabrics having aligned fiber orientation of the type mentioned above is described in DE 103 45 953 A1. In this method a non-woven is produced by means of a lateral plaiting machine, wherein, however a combination of a filament web and a fiber web is fed to the lateral plaiting machine such that layers of finite and endless fibers are successively laid within the non-woven, and the same is therefore not a pure laid staple fiber fabric. Aligned fiber orientations are not created therein. As is common, the lateral plaiting machine is aligned at an angle of 90° toward the advance direction of the transport belt, and the latter has no continuous advance.

OBJECT OF THE INVENTION

The present invention is therefore based on the object of enabling the continuous production of laid staple fiber fabrics from finitely long reinforcing fibers with aligned fiber orientation. Said laid staple fiber fabrics are used for the product of high-strength fiber-reinforced plastic composites as are used in wind power plants, aircraft construction and the automotive industry. It is important that in particular the loading direction of said composites have high composite strengths and rigidities, to which end a defined fiber orientation is required. In addition to a defined orientation the laid fabrics should also have a defined mass per unit area.

BRIEF DESCRIPTION OF THE DRAWINGS

FIG. 1 is a schematic representation of the process of the present invention.

DETAILED DESCRIPTION OF THE ILLUSTRATIVE EMBODIMENT

According to the invention the task is solved in that the laying down of the fiber web is carried out onto a synchronized transport belt, which stands still at a predetermined angle during the continuous laying down of the fibers, and is not moved until the laying width has been laid down at a defined distance (laying offset). In this manner the fiber orientation is constant within the predetermined laying width. The laying down of the fiber web is therefore carried out at an exactly defined angle.

The desired orientation is achieved by means of the alignment of the carding machine and the plaiting machine at the predetermined angle toward the transport belt (image 1).

Preferably, at least one carding machine producing the fiber web, and the plaiting machine being connected downstream of the same, by means of which the laying of the fiber is carried out onto the transport belt, are disposed at an acute angle to the advance direction of the synchronized transport belt. In particular, angles of alignment in the range of between about 30° to about 60° toward the advance direction of the transport belt are preferred, particularly preferred are angles at a magnitude of about 40° to about 50°, i.e. angles about 45°+/− a few angle degrees. With the common plaiting machines operating with a continuously moved transport belt said angles can generally not be achieved.

According to the invention work may be carried out with a carding machine and a plaiting machine connected downstream thereof, however, it is also possible to utilize multiple carding machines having plaiting machines connected downstream thereof, which are disposed at the desired angles toward the transport belt. In this manner the mass per unit area of the laid fabric to be produced may be increased. Furthermore, multiple laying angles may be created simultaneously. This enables a very economic laying process. Therefore, it is preferred that at least one first carding machine with a first plaiting machine connected downstream thereof is disposed at a first acute angle provided for laying the fiber in relation to the transport belt, and that at least one second carding machine having second plaiting machine connected downstream thereof is disposed at an acute angle provided for the laying of the fiber in relation to the transport belt, wherein said second angle is aligned perpendicular to the first angle.

Preferably, the method according to the invention functions such that the fiber web is laid onto the transport belt at a forward movement of the plaiting machine, the transport belt is subsequently moved by a defined distance (laying offset), and then another laying of the fiber web is carried out at a backward movement of the plaiting machine, again while the transport belt stands still.

It may be provided, for example, that the plaiting machine(s) moves beyond the edge of the transport belt before the movement is reversed, i.e. the transport belt is moved by the defined distance in advance direction at about that point in time of said reverse movement, and after laying the fiber web, the longitudinal edge area of the laid fabric is then cut. This has the advantage that any distortion of the laid fabric that may have occurred in the edge area is therefore removed by means of the short advance movement of the transport belt.

According to a further development of the invention at least a fiber web made of a mixture of staple fibers having different compositions and/or different properties, in particular comprising finite reinforcement fibers and/or binding fibers, may be used as the base material, or at least two fiber webs having different compositions and/or different properties, in particular comprising finite reinforcement fibers and/or binding fibers may be laid, for example, if two carding machines and plaiting machines respectively connected downstream thereof, are utilized.

The fiber web preferably consists of finitely long fibers of a length in the range of 25 to 150 mm. The fiber web may in particular be equipped with binders for reinforcement at a later time, or also be made of a mixture of staple fibers having different compositions or properties (e.g. reinforcement fibers and binding fibers). Due to the preferred use of binders or thermoplastic binding fibers, a subsequent thermal reinforcement of the laid fabric is possible. The reinforcement fibers may, for example, be natural fibers or high-strength fibers, such as aramid, glass, basalt, or carbon fibers. In this process it is also possible, for example, to utilize finitely long reinforcement fibers made from recycling processes for the production of laid fabrics having a defined fiber orientation and mass per unit area.

One advantage of the method is the possibility of producing laid fabric made from staple fibers for composite materials having constant laying angles, high fiber orientation, and defined mass per unit area in one continuous process at a high rate of operational capacity.

The fiber web formed by the carding machine preferably comprises a high longitudinal orientation such that an anisotropy of the composite strengths and/or of the composite rigidities may be achieved in a fiber plastic composite (FKV), for example, in a range of 1:1.5 to 1:10.

The laid fabric produced according to the invention may be combined with at least one additional functional of carrier layer, and may therefore be adjusted for a wide range of different applications.

A preferred further development of the method according to the invention provides that adjacent layers of the fiber web, each laid parallel to each other, overlap themselves at the edge areas thereof. A small degree of overlapping may already be advantageous for this purpose. In this manner an improved composite of the individual layers is achieved in the laid staple fiber fabric to be produced.

A downholder may also be used in order to avoid any distortion of the laid fiber web in the edge area of the laid fabric.

The solution according to the invention enables the laying of parallel adjacent layers of the fiber web at an exact angle at comparably high laying speeds. The carding machine and the plaiting machine connected downstream thereof, provide an exact angle of fiber orientation due to their alignment toward the transport belt. If two fiber webs having two cording machines and plaiting machines working independently of one another are laid at an angle of 90° toward each other in two positions on top of each other onto the transport belt an isotropic laid staple fiber fabric is created, having a defined alignment of the fibers.

The characteristics stated in the sub-claims relate to preferred further embodiments of the solution of the task according to the invention. Further advantages of the method according to the invention are obvious from the following detailed description.

The invention is described below in further detail based on preferred exemplary embodiments with reference to the attached drawings.

EXAMPLES

Exemplary Embodiment 1

A fiber web having a high fiber longitudinal orientation and a mass per unit area of 30 g/m² is created via a cording machine at a working width of 1 m. Said fiber web is laid onto a synchronized transport belt by means of a horizontal plaiting machine at a laying width of 2 m. For this purpose the cording machine is disposed with the plaiting machine connected downstream thereof at an angle of +45° toward the drawing off direction of the transport belt. During the laying of the fiber the transport belt stands still. After the laying of the provided width (forward movement of the plaiting machine) the transport belt is moved forward by 0.7 m. Subsequently, the laying of the fiber web (backward movement of the plaiting machine) is again carried out. In this manner a laid fabric may be created, having a fiber orientation of +45° and a mass per unit area of 60 g/m².

Exemplary Embodiment 2

2 fiber webs having a high fiber longitudinal orientation at a working width of 1 m each are produced by means of 2 cording machines. The fiber webs are laid onto a synchronized transport belt at a laying width of 3 m by means of horizontal plaiting machines. For this purpose the cording machines, are disposed with the plaiting machines connected downstream thereof at an angle of ±45° toward the drawing off direction of the transport belt. During the laying of the fiber the transport belt stands still. After the laying of the provided width (forward movement of the plaiting machine) the transport belt is moved forward by 0.7 m. Subsequently, the laying of the fiber web (backward movement of the plaiting machine) is again carried out. In this manner a laid fabric may be created, having a fiber orientation of ±45° and a mass per unit area of 120 g/m².

LIST OF REFERENCE SYMBOLS

1 transport belt
2 carding machine 1
3 plaiting machine 1
4 carding machine 2
5 plaiting machine 2

The invention claimed is:

1. A method for the continuous production of laid staple fiber fabrics with aligned fiber orientation, wherein the laid fabrics are produced by means of continuous plaiting of carded fiber web at defined laying angles, characterized in that the laying of the fiber web is carried out onto a synchronized transport belt, which stands still during the continuous laying of the fiber at the predetermined angle, and does not move until after the provided laying width by a defined distance (laying offset) has been carried out and wherein at least one carding machine (2, 4) producing the fiber web, and the plaiting machine (3, 5) connected downstream thereof, by means of which the laying of the fiber is carried out onto the transport belt (1), are disposed at an acute angle to the advance direction of the synchronized transport belt.

2. The method according to claim 1, characterized in that the at least one first carding machine (2) with the first plaiting machine (3) connected downstream thereof are disposed at a first acute angle provided for the laying of the fiber in relation to the transport belt (1), and at least a second carding machine (4) with a second plaiting machine (5) connected downstream thereof are disposed at a second acute angle provided for the laying of the fiber in relation to the transport belt, wherein said second angle is aligned perpendicular to the first angle.

3. The method according to claim 1 characterized in that the fiber web is laid onto the transport belt (1) with each forward movement of the plaiting machine (3, 5), the transport belt is subsequently moved by a defined distance (laying offset), and another laying of the fiber web is then carried out with a backward movement of the plaiting machine while the transport belt stands still.

4. The method according to claim 2, characterized in that the plaiting machine(s) (3, 5) moves beyond the edge of the transport belt before a reverse movement thereof, the transport belt (1) is moved by the defined distance in advance direction at about that point in time of said reverse movement, and the longitudinal area of the laid fabric is cut after the laying of the fiber web.

5. The method according to one of the claim 1, characterized in that at least a fiber web made from a mixture of staple fibers having different compositions and/or different properties.

6. The method according to claim 5, characterized in that the reinforcement fibers have a length of 25 to 150 mm.

7. The method according to one claim 1, characterized in that the fiber web is afterwards treated with binders.

8. The method according to claim 1, characterized in that a fiber web made from a defined mixture of reinforcement fibers and binding fibers at a high fiber longitudinal orientation is used.

9. The method according to claim 5, characterized in that the laid fabric is subsequently thermally reinforced.

10. The method according to claim 1, characterized in that the laid fabric produced in this manner is further combined with at least one additional functional or carrier layer.

11. The method according to claim 1, characterized in that adjacent layers of the fiber web laid parallel to each other overlap each other in the edge areas thereof.

* * * * *